(12) United States Patent
Ley et al.

(10) Patent No.: US 10,290,051 B1
(45) Date of Patent: *May 14, 2019

(54) SAVINGS SYSTEM BASED ON CENT PORTION OF TRANSACTION AMOUNT

(75) Inventors: Michael Ley, Moon Township, PA (US); Thomas Kunz, Pittsburgh, PA (US); Bryan Mackrell, Pittsburgh, PA (US); Christopher Michael Bajgier, Allison Park, PA (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 1987 days.

This patent is subject to a terminal disclaimer.

(21) Appl. No.: 12/141,364

(22) Filed: Jun. 18, 2008

(51) Int. Cl.
*G06Q 50/12* (2012.01)
*G06Q 40/00* (2012.01)

(52) U.S. Cl.
CPC .................................. *G06Q 40/00* (2013.01)

(58) Field of Classification Search
CPC ........ G06Q 20/10; G06Q 40/10; G06Q 40/02; G06Q 40/00; G06Q 30/04
USPC .......................................................... 705/30
See application file for complete search history.

(56) References Cited

U.S. PATENT DOCUMENTS

| | | | |
|---|---|---|---|
| 5,716,211 A * | 2/1998 | Vetter | G09B 19/18 434/107 |
| 6,112,191 A | 8/2000 | Burke | |
| 6,164,533 A | 12/2000 | Barton | |
| 6,216,358 B1 | 4/2001 | Barrameda et al. | |
| 6,631,358 B1 | 10/2003 | Ogilvie | |
| 7,797,233 B2 * | 9/2010 | Sobek | G06Q 20/04 705/38 |
| 2005/0177502 A1 * | 8/2005 | Thomas | G06Q 20/102 705/40 |
| 2006/0047589 A1 | 3/2006 | Grau | |
| 2007/0033134 A1 | 2/2007 | Carretta et al. | |
| 2009/0063332 A1 * | 3/2009 | Tabaczynski | G06Q 20/10 705/39 |
| 2009/0259541 A1 * | 10/2009 | Morrison, Jr. | G06Q 30/02 705/14.17 |
| 2009/0327133 A1 * | 12/2009 | Aharoni | G06Q 20/10 705/44 |

FOREIGN PATENT DOCUMENTS

WO 9404979 3/1994

* cited by examiner

*Primary Examiner* — Garcia Ade
(74) *Attorney, Agent, or Firm* — Buchanan Ingersoll & Rooney PC; Robert J. Pugh

(57) ABSTRACT

A computer-assisted method for an automatic savings plan. The method includes calculating a savings amount from a cent amount of each of a plurality of transactions. The method also includes transferring the savings amount from a first account to at least one receiving account.

32 Claims, 8 Drawing Sheets

Online Banking & Bill Pay

| Benefits | Accessing Accounts | Paying Bills | Making Transfers | Customer Service |
|---|---|---|---|---|
| Signing On | Setting Up | Account Summary | Account Activity | Wealth Management |

Online Banking — 36

My Accounts | My Profile | Transfer Funds | Bill Center | Message Center | My Offers Sign Off

Account Detail — 38

- Online Statements
- Account Nicknames
- Images & Copies
- Stop Payment
- Reorder Checks
- Check/ATM Cards
- Campus ID Card
- Gift Cards Regular Checking XXXXXX1234 ▼   View All Accounts | Edit Account Nickname | Help?

Available Balance $843.36

Summary | Pending Transactions | Posted Transactions | Online Statements | Auto Alerts Detail by Date | Detail by Type | Search Transactions All Deposits Checks and Deductions ▼

[Export]

| Date | Description | Withdrawls | Deposits | Balance |
|---|---|---|---|---|
| 06/20/2007 | CHECK CARD PURCHASE XXXXXX1234 GAS STATION | $20.00 | | $863.36 |
| 06/20/2007 | ONLINE TRANSFER FROM XXXXXX6789 | | $500.00 | $363.36 |
| 06/19/2007 | POS PURCHASE POSXXXXX1234 PHARMACY | $24.23 | | $387.59 |
| 06/16/2007 | CHECK CARD PURCHASE XXXXXX1234 CONVENIENT STORE | $22.75 | | $410.34 |
| 06/16/2007 | ACH WEBSINGLE CKFXXXXX9999POS ELECTRIC COMPANY ONLINE | $158.63 | | $568.97 |
| 06/12/2007 | CHECK CARD PURCHASE XXXXXX1234 DEPARTMENT STORE | $87.40 | | $656.37 |

40 — 42

[Sign Off]

Did You Know? You Can Get Special Discounts When You Pay With Your Check Card.

New to online banking? △ Get Started Now!

SAVINGS SYSTEM BASED ON CENT PORTION OF TRANSACTION AMOUNT

BACKGROUND

In recent years personal savings rates have continued to decline and the amount of debt has continued to rise in the United States. Many customers of financial institutions have one primary bank account from which they conduct all of their financial transactions, including paying bills, discretionary spending, saving, etc. The abundant availability of ATMs and credit and debit cards makes consumer spending convenient, resulting in easy depletion of funds available for other expenses and leaving no funds available for savings. As mobile networks and on-line banking continue to expand, financial customers want easy, identifiable transactions as well as immediate access to available funds. To meet this demand and to encourage personal savings by their customers, financial institutions are constantly improving their electronic and on-line banking services. Still, there is a need for simplified and effective methods of saving for customers using one primary account or a small number of accounts for all their financial transactions.

SUMMARY

In one general aspect, embodiments of the present invention pertain to a system and method for automatic personal savings based on the amount of transactions occurring within a bank account. Embodiments of the present invention allow a bank customer to allocate a savings amount equal to an aggregated amount of the cent portion, i.e. 1 cent to 99 cents, of designated transactions within a bank account during a specified time period, for example daily, weekly, monthly, quarterly, or yearly. The savings amount is transferred to at least one designated receiving account. The receiving account may be, for example without limitation, a money folder within the account, a separate bank account such as the customer's savings account or investment account, another party's account, or multiple folders and accounts.

Those and other details, objects, and advantages of the present invention will become better understood or apparent from the following description and drawings showing embodiments thereof.

BRIEF DESCRIPTION OF THE DRAWINGS

Various embodiments of the present invention are described herein by way of example in conjunction with the following figures, wherein:

FIG. 2 illustrates a screen shot of an online or electronic banking interface in which embodiments related to enrolling in a savings plan of the present invention may be used;

FIG. 5. illustrates a screen shot of an online or electronic banking interface in which embodiments related to processing and aggregating a cent amount of a plurality of transactions for an automatic savings plan of the present invention may be used;

DESCRIPTION

In general, various embodiments of the present invention are directed to systems and methods relating to an automatic savings plan that uses an account, such as a debit (e.g., checking) account or a credit account, offered to customers by financial services entities as a savings tool. The systems and methods, in various embodiments, aggregate cent amounts, i.e. 1 cent to 99 cents, from a plurality of transactions (e.g., debit transactions or credit transactions) over a specified period of time. After the specified period of time, the aggregated amount is deducted from a first account and transferred to at least one receiving account. Although various embodiments are illustrated herein as being implemented and used in an online or electronic banking environment, it can be understood that the systems and methods described herein may be used in any type of banking environment.

Figure 1:
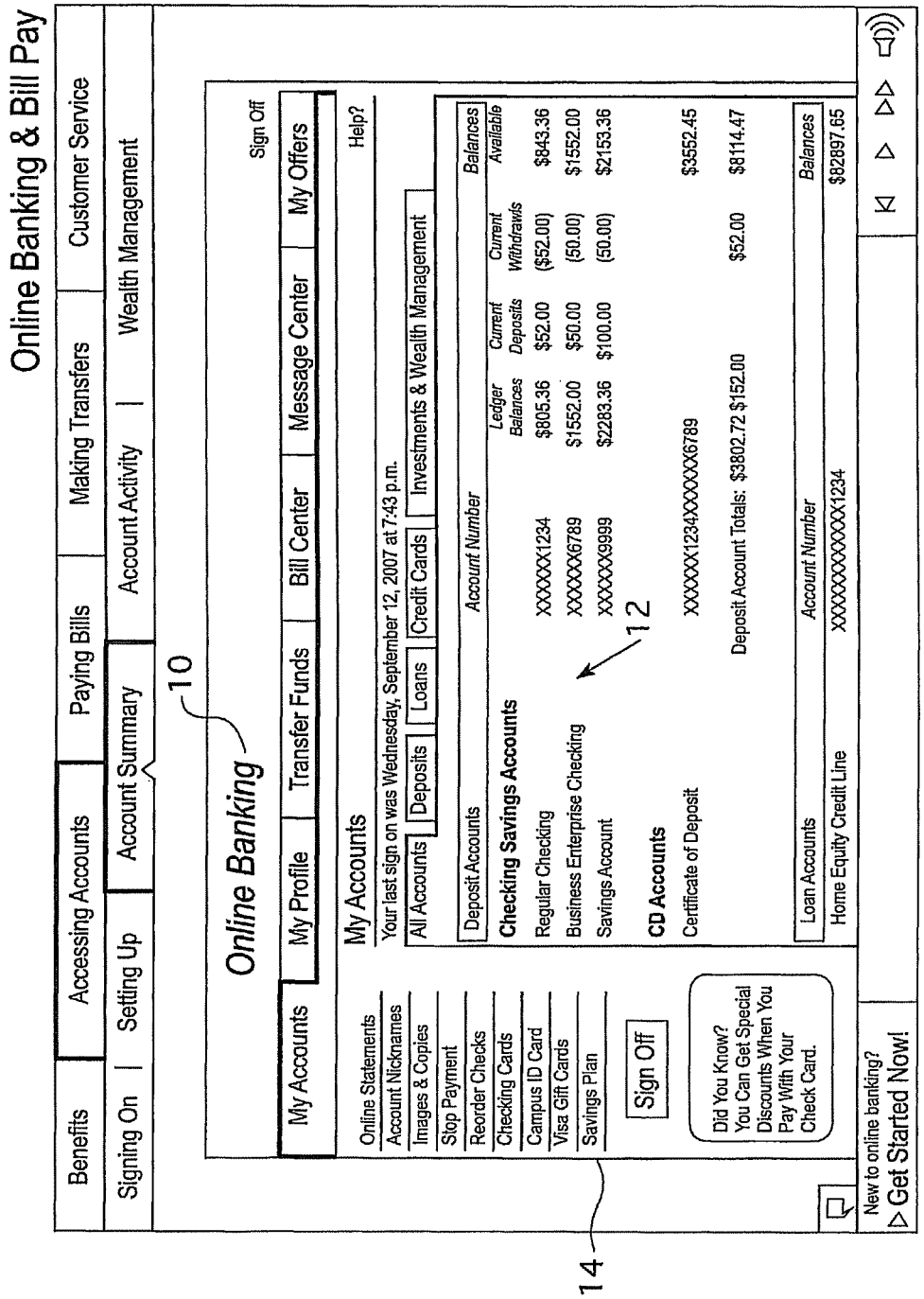
FIG. 1 illustrates a screen shot of an online or electronic banking interface in which embodiments of the present invention may be used.

FIG. 1 illustrates a screen shot of an online or electronic banking interface 10 in which embodiments of the present invention may be used. As can be seen, a customer has access to an account 12, such as a debit (e.g., checking) account or credit account, which is identified by an account number. As an example, to enroll in the savings plan the customer would click on an icon 14 for the savings plan. In various embodiments, the customer may enroll in the savings plan using a telephone, in person, by mail, by email, by text or instant message, etc.

Figure 2:
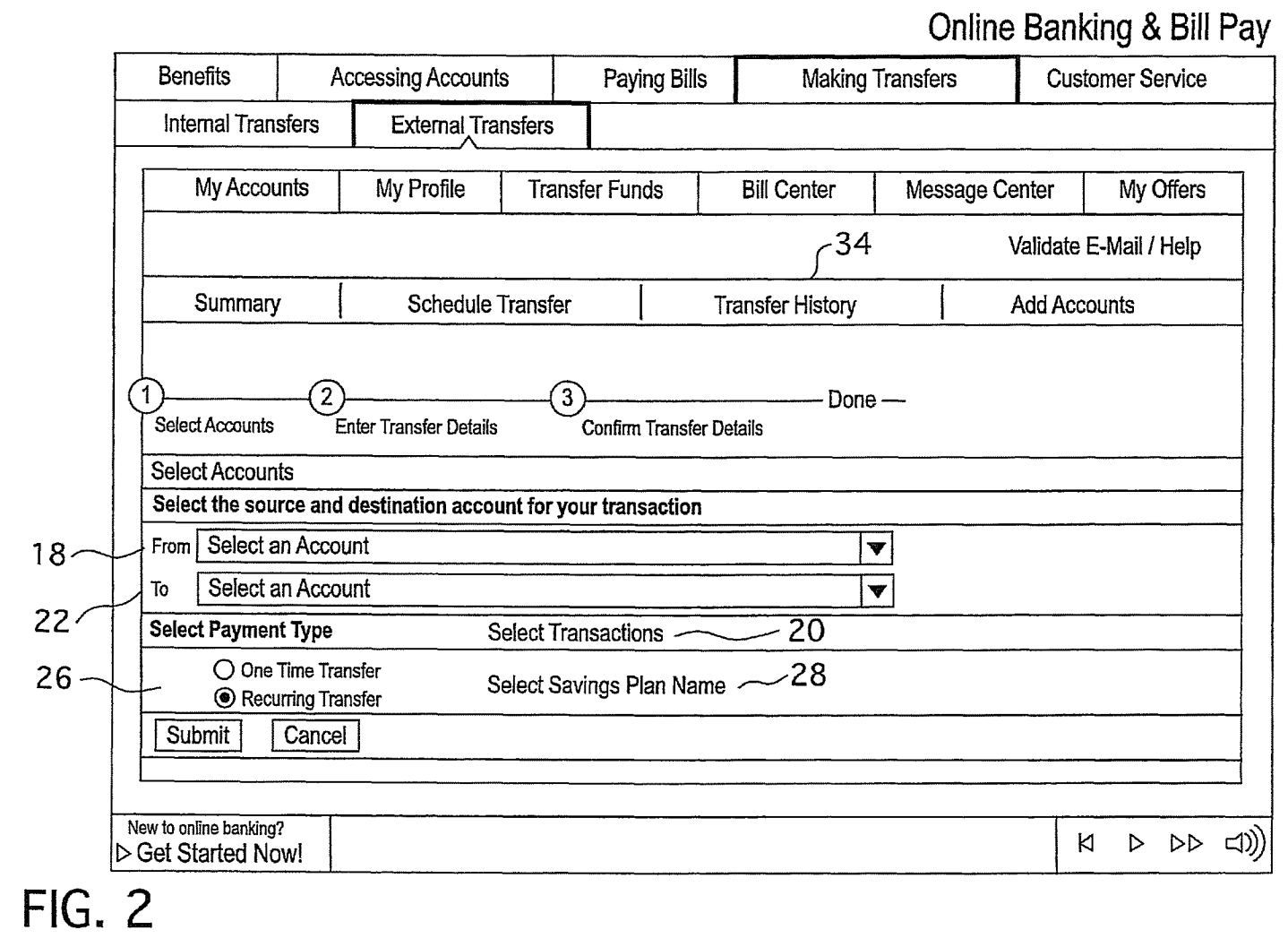
Figure 3:
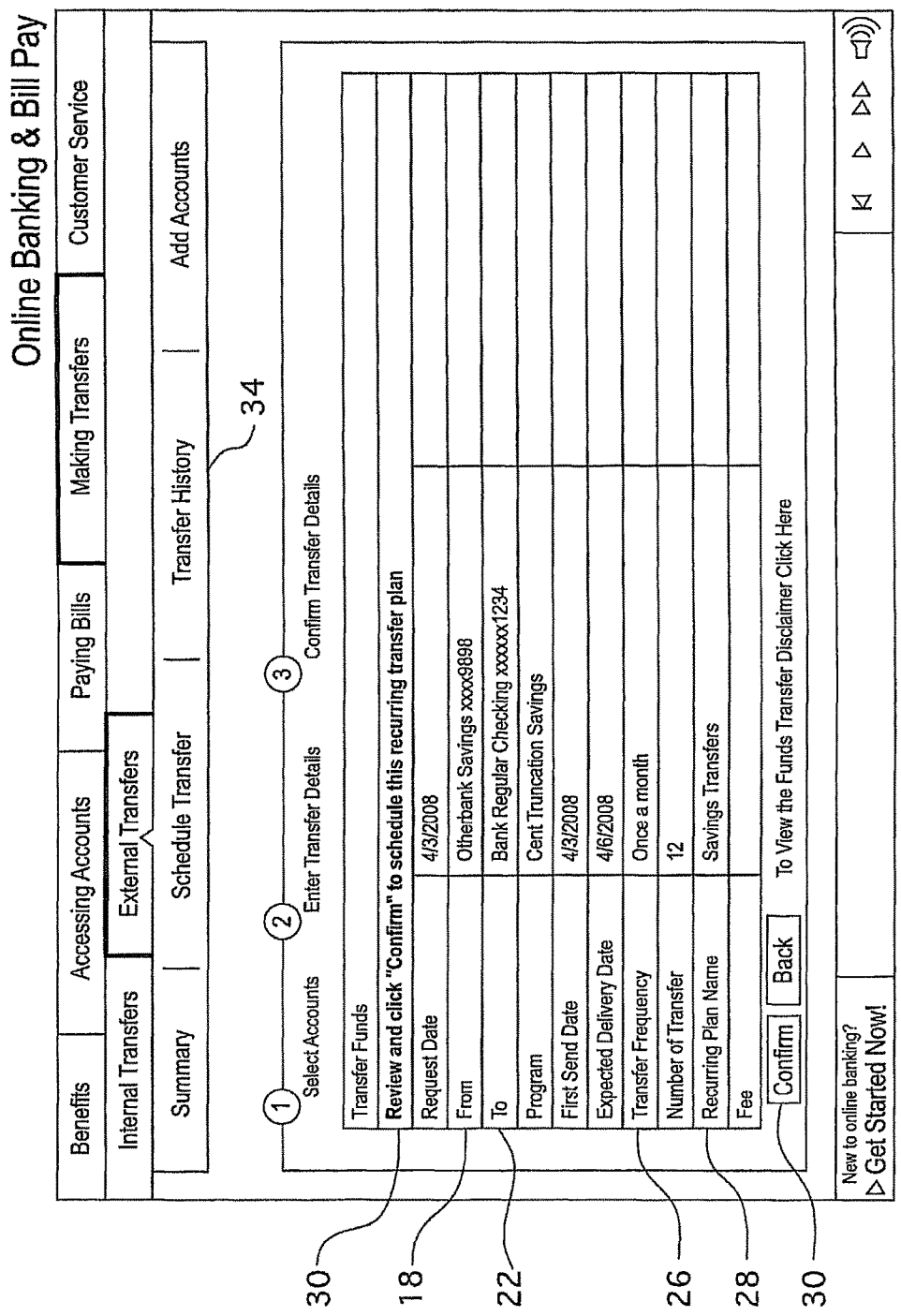
FIG. 3 illustrates a screen shot of an online or electronic banking interface in which embodiments related to confirming a savings plan of the present invention may be used.
Figure 4:
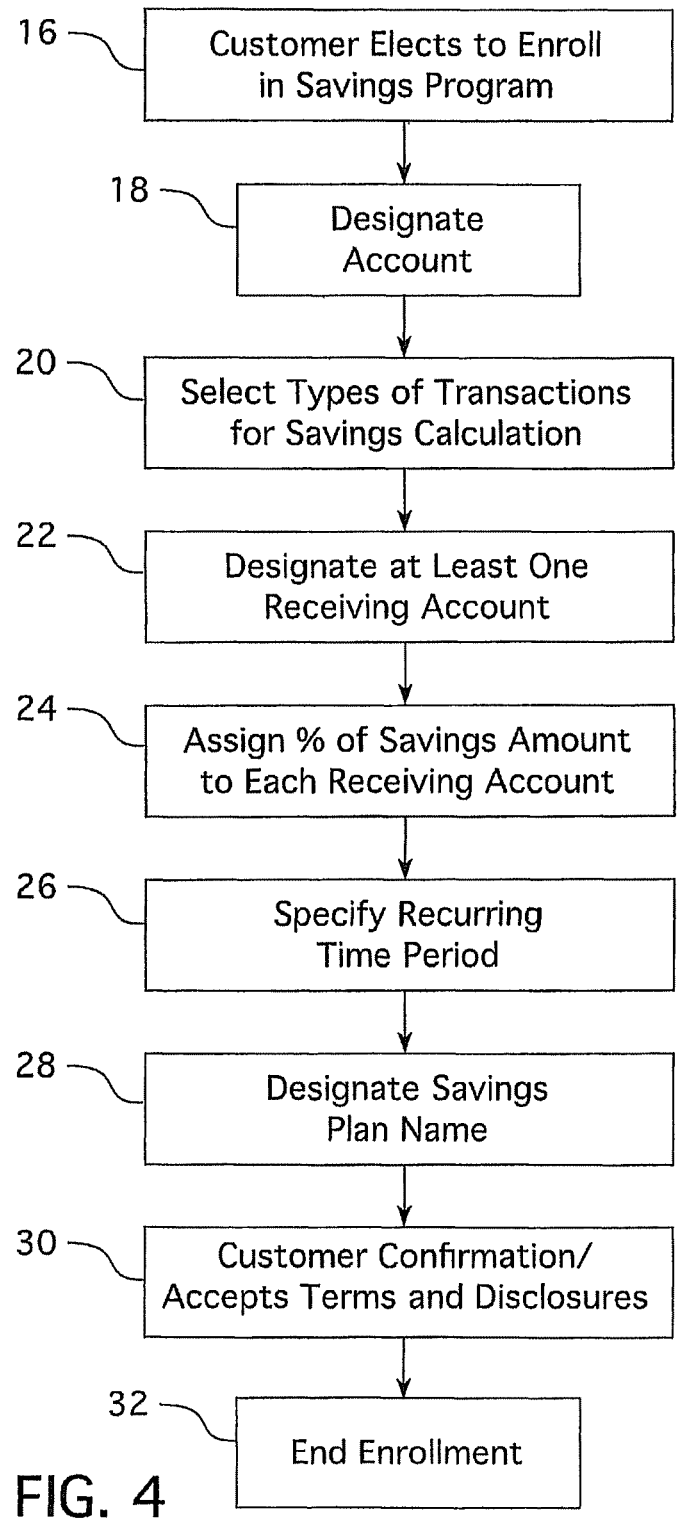
FIG. 4 illustrates a flowchart of an embodiment of a method for enrolling a customer in an automatic savings plan within an account.

FIG. 2 and FIG. 3 illustrate example screen shots of online or electronic banking interfaces for completing enrollment in the savings plan. FIG. 4 illustrates a flowchart of an embodiment of a method for enrolling a customer in an automatic savings plan within an account, such as a debit (e.g., checking) or credit account. The customer elects to enroll in the savings program at 16, for example by clicking on the icon 14, by telephone, in person, by mail, by email, by text or instant message, etc., for the savings program. The customer designates the account 12 to be used for the automatic savings program at step 18. At step 20, the customer selects at least one type of transaction, for example check card, paper check, bill pay, point of service purchases, credit transaction, etc., to be used by the savings program for calculating a savings amount.

The customer designates at least one receiving account to receive the aggregated savings amount at step 22. For example, the receiving account may be a savings account, investment account, another party's account, a subfolder within the account, multiple accounts, etc. If more than one receiving account is designated, the customer assigns a percentage of the savings amount to each account at step 24. For example, if two receiving accounts are designated, then the customer could assign each account 50% of the savings amount. At step 26, the customer specifies a recurring time period, such as daily, weekly, monthly, quarterly, yearly, etc.

for aggregating the cent amount of the transactions. In one embodiment, the customer designates a name at step 28, for example without limitation, "savings plan transfer," "cent truncation savings program transfer," "transfer from grandma," etc., for a transfer transaction of the savings program between the account 12 and the receiving account. In one embodiment, the customer confirms the designations for the automatic savings program and accepts any terms and disclosures for the savings plan at step 30. Enrollment ends at step 32. In one embodiment, the customer may view the transfer history by clicking or selecting icon 34 as illustrated in FIGS. 2 and 3.

FIG. 5 illustrates a screen shot of an online or electronic banking interface 36 in which embodiments of the present invention related to processing and aggregating a cent amount of a plurality of transactions may be used. As can be seen, transactions are posted to an account 38, such as a checking account or credit account. The cent amounts from transactions having cent amounts, i.e. 1 cent to 99 cents, are aggregated. For example, check card purchase 40 has no cent amount and therefore would not be considered; however, point of service purchase 42 would have an amount of 23 cents aggregated to the savings amount.

Figure 6:
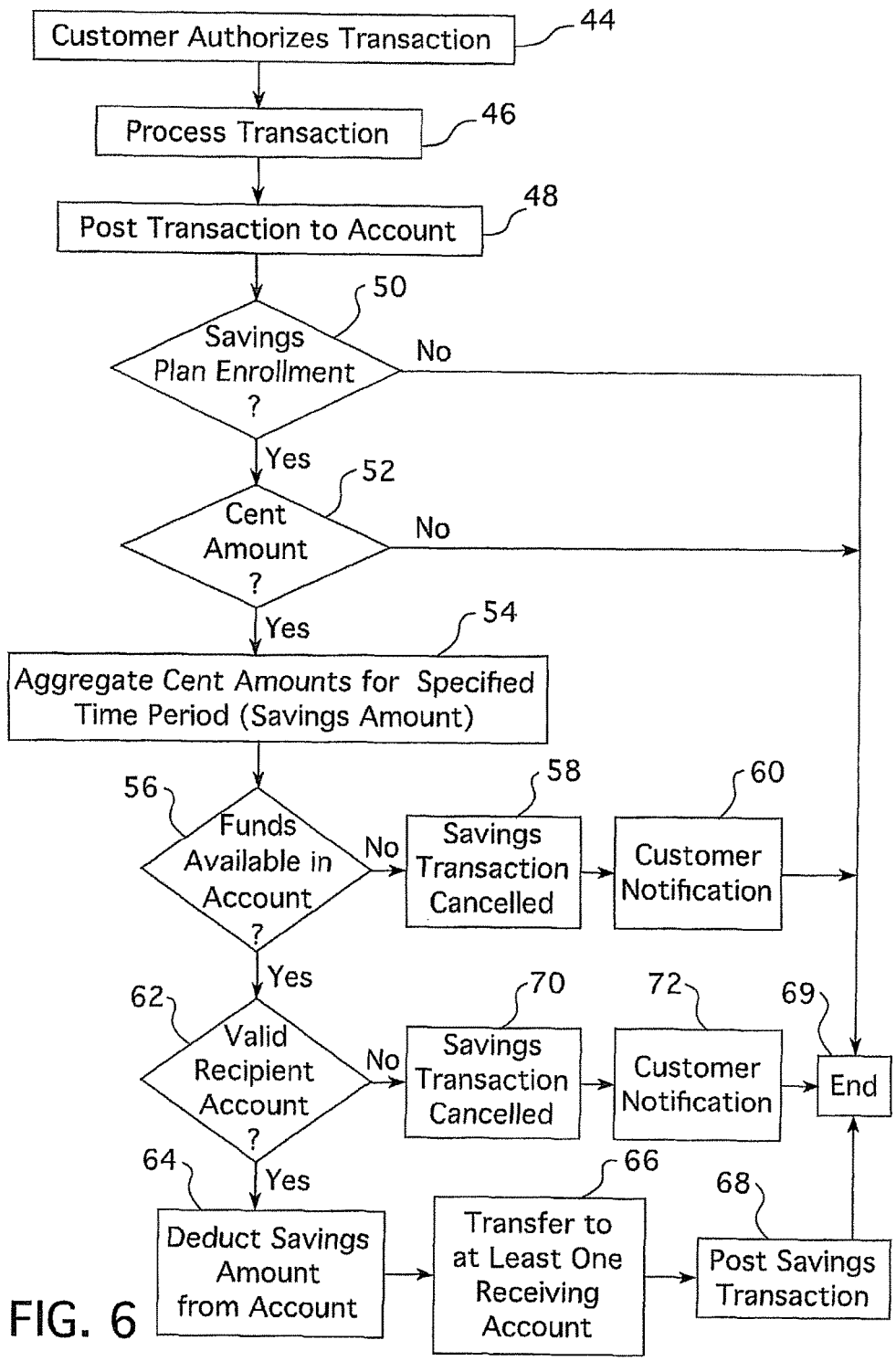
FIG. 6 illustrates a flowchart of an embodiment of a method for processing and aggregating a cent amount of a plurality of transactions and transferring the aggregated savings amount to at least one receiving account.

FIG. 6 illustrates a flowchart of an embodiment of a method for processing and aggregating a cent amount of a plurality of transactions and transferring an aggregated savings amount to at least one receiving account. After a transaction is authorized at 44, processed at 46, and posted to the account at 48, customer enrollment in the automatic savings program is determined at step 50. If the customer is not enrolled, then normal processing continues and ends at 69. If the customer is enrolled in the automatic savings plan, then the type of transaction must be considered. If the transaction is eligible for consideration by the savings plan, the cent amount of the transaction is examined at step 52. If there is no cent amount, then the method ends at 69. If there is a cent amount between 1 cent and 99 cents (e.g., the transaction was for a dollar amount that included a cent portion), the amount is added at step 54 to a savings amount. Steps 44 through 54 continue for each transaction over the specified period of time, such as weekly, for example, to calculate the total aggregated savings amount.

After the savings amount is calculated for the specified period of time, the amount of funds available in the account is determined at step 56 to ensure there are enough funds available to deduct the savings amount from the account. If there are not enough funds in the account to complete the transaction, the savings program transaction is cancelled at step 58 and the customer notified at step 60. The receiving account is checked for validity at step 62. If the receiving account is valid, then the savings amount is deducted from the account at step 64. The savings amount is transferred at step 66 to the receiving account(s) as designated during enrollment and the savings plan transaction is posted to both the funding account and the receiving account at step 68. The program is completed for the specified time period at 69. If the recipient account is invalid, the transaction is cancelled 70. A notice is sent to the customer to terminate or update the enrollment for the savings plan at step 72 and processing ends at 69 until further input from the customer.

Figure 7:
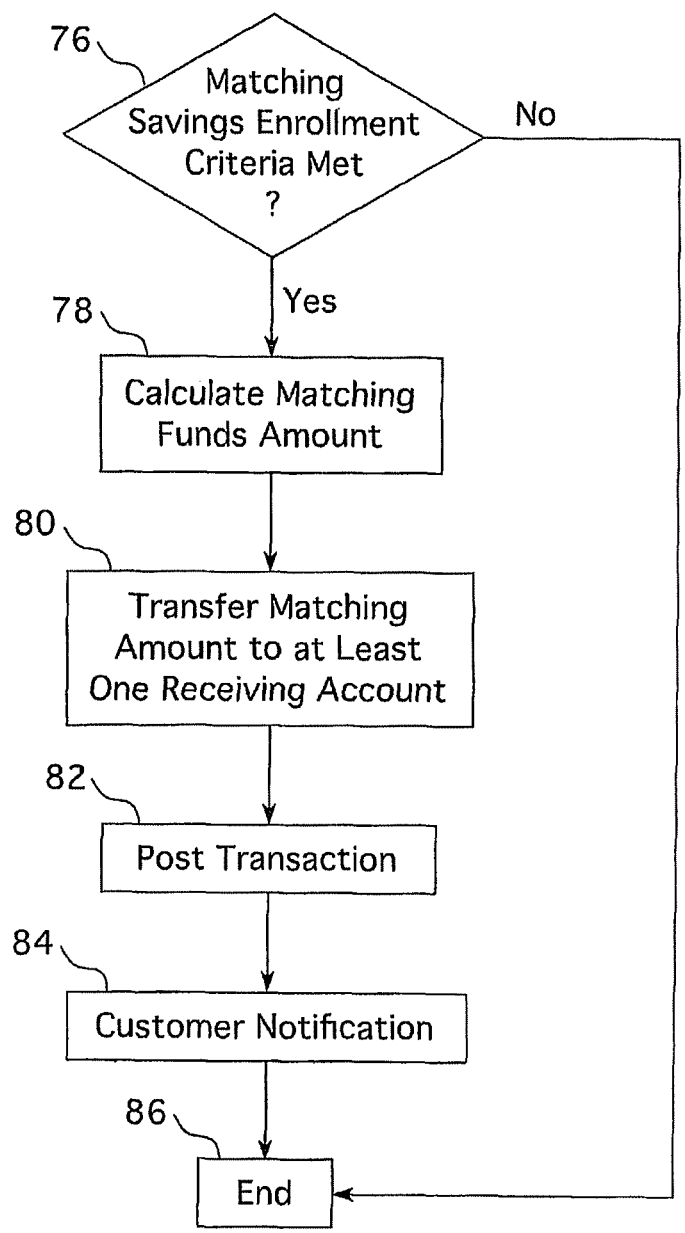
FIG. 7 illustrates a flowchart of an embodiment of a method for calculating and transferring matching funds for an automatic savings plan of the present invention.

FIG. 7 illustrates a flowchart of an embodiment of a method for calculating and transferring matching funds from a financial services entity for the automatic savings plan. As an optional embodiment, the financial services entity may match the savings amount. For example, the matched funds may be a percent of the aggregated savings amount or equal to the savings amount. After the aggregated savings amount is calculated for the specified time period, the matching savings enrollment criteria is checked at step 76. If the criteria are met, the matching funds are calculated at step 78. At step 80, the matching funds amount is transferred to at least one receiving account based on the designation for the savings amount and posted at step 82. In another embodiment, a message, for example an email or an SMS text message, is sent to the customer indicating the matching funds transfer at step 84. The process ends for the specified time period at 86.

Figure 8:
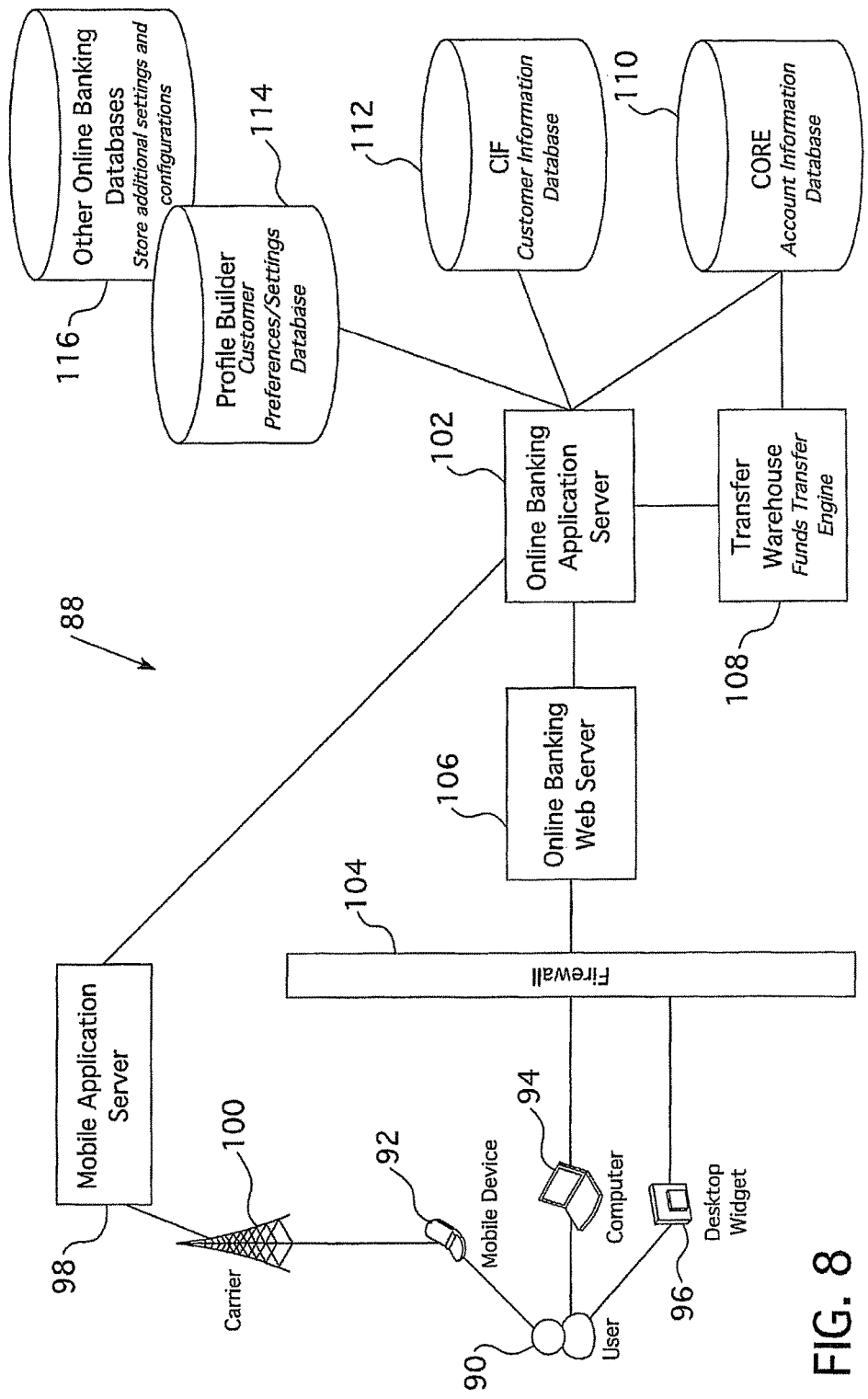
FIG. 8 illustrates an embodiment of a system in which embodiments of the present invention may be used.

FIG. 8 illustrates an embodiment of a system 88 in which embodiments of the present invention may be used. A user 90 utilizes a network-enabled client device with a display having a user interface, such as a mobile device 92, a computer 94, a desktop widget 96, or any other suitable device. The mobile device 92 accesses, via a mobile application server 98 and a wireless carrier 100, an online banking application server 102 (i.e., a host system of the funding account). The online banking application server 102 or a processor may perform some or all of the steps of the methods for aggregating a cent amount of designated transactions occurring within the funding account over a specified period of time and transferring to at least one receiving account as described in various embodiments herein. The computer 94 and the desktop widget 96 access the online banking application server 102 via a firewall 104 protected online banking web server 106.

The online banking application server 102 is in communication with a transfer warehouse 108 (funds transfer engine), an account information database 110, a customer information database 112, a customer preferences/settings database 114, and other online banking databases 116 that store additional settings and configurations.

Various embodiments of the present invention may be implemented on computer-readable media. The terms "computer-readable medium" and "computer-readable media" in the plural as used herein may include, for example, magnetic and optical memory devices such as diskettes, compact discs of both read-only and writeable varieties, optical disk drives, hard disk drives, etc. A computer-readable medium may also include memory storage that can be physical, virtual, permanent, temporary, semi-permanent and/or semi-temporary. A computer-readable medium may further include one or more data signals transmitted on one or more carrier waves.

While several embodiments of the invention have been described, it should be apparent that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention.

What is claimed is:

1. A computer-assisted method for an automatic savings plan, the method comprising:
   enrolling, by a processor of an electric online banking application server, a customer in the automatic savings plan, wherein enrolling the customer comprises:
   the customer designating, via a user interface of a client device, a first account as a funding account;
   the customer designating, via the user interface, at least one second account as a receiving account;
   the customer designating, via the user interface, at least one type of transaction to be included in the automatic savings plan; and
   the customer designating, via the user interface, a specified time period to determine a savings amount;

receiving, from an account information database, an account of a plurality of transactions that fall within the at least one type of transaction, wherein the processor of the electronic online banking application server receives the account of the plurality of transactions;

aggregating, by the processor of the electronic online banking application server, a cent amount of each of the plurality of transactions, the cent amount for each transaction being the decimal amount of a purchase price for the transaction, the aggregating occurring over the specified time period to determine the savings amount;

transferring, by a funds transfer engine operatively associated with the processor of the online banking application server, the savings amount from the funding account to the receiving account.

2. The method of claim 1, wherein enrolling the customer further comprises assigning a name for a transfer transaction of the savings plan between the funding account and the receiving account.

3. The method of claim 1, wherein enrolling the customer further comprises accepting, by the customer, at least one of a term and a disclosure.

4. The method of claim 1, wherein enrolling the customer further comprises sending a customer confirmation.

5. The method of claim 1, wherein the receiving account is a folder within the first account.

6. The method of claim 1, wherein the at least one second account comprises a plurality of second accounts as the receiving account, the method further comprises assigning a percentage of the savings amount to each second account.

7. The method of claim 1, further comprising processing the plurality of transactions.

8. The method of claim 7, wherein processing the plurality of transactions further comprises checking a savings plan enrollment.

9. The method of claim 7, wherein processing the transactions further comprises determining an amount of a transaction eligible for the savings plan.

10. The method of claim 1, further comprising ensuring sufficient funds are available in the first account prior to transferring the savings amount from the funding account to the receiving account.

11. The method of claim 1, further comprising transferring the savings amount from the first account at a specified time.

12. The method of claim 1, further comprising validating the receiving account.

13. The method of claim 1, further comprising sending a notice to the customer if the receiving account is invalid.

14. The method of claim 1, further comprising posting a transaction that falls within the at least one type of transaction to the first account and the receiving account by displaying the transaction via the user interface.

15. The method of claim 1, further comprising transferring a matching funds amount to the receiving account upon meeting a criterion of a matching savings plan, wherein the matching funds amount is calculated based on the savings amount.

16. A system for an automatic savings plan, the system comprising:

an account information database; and an electronic online banking application server operatively associated with the account information database, the server having a processor configured to:

enroll a customer in the automatic savings plan, wherein enrolling the customer comprises: the customer designating, via a user interface of a client device, a first account as a funding account the customer designating, via the user interface, at least one second account as a receiving account the customer designating, via the user interface, at least one type of transaction to be included in the automatic savings plan; and the customer designating, via the user interface, a specified time period to determine a savings amount;

receive, from the account information database, an account of a plurality of transactions that fall within the at least one type of transaction;

aggregate a cent amount of each of the plurality of transactions, the cent amount for each transaction being the decimal amount of a purchase price for the transaction, the aggregating occurring over the specified time period to determine the savings amount;

transfer, by a funds transfer engine operatively associated with the server, the savings amount from the funding account to the receiving account.

17. The system of claim 16, wherein to enroll the customer, the processor is further configured to accept a name of a transfer transaction of the savings plan between the funding account and the receiving account.

18. The system of claim 16, wherein to enroll the customer, the processor is further configured to require the customer to accept at least one of a term and a disclosure.

19. The system of claim 16, wherein to enroll the customer, the processor is further configured to send a customer confirmation.

20. The system of claim 16, wherein the receiving account is a folder within the first account.

21. The system of claim 16, wherein the at least one second account comprises a plurality of second accounts as the receiving account, and the processor is further configured to assign a percentage of the savings amount to each second account.

22. The system of claim 16, wherein the processor is further configured to process the plurality of transactions.

23. The system of claim 22, wherein to process the plurality of transactions, the processor is further configured to check a savings plan enrollment.

24. The system of claim 22, wherein to process the transactions, the processor is further configured to determine an amount of a transaction eligible for the savings plan.

25. The system of claim 16, wherein the processor is further configured to ensure sufficient funds are available in the first account to accommodate transferring the savings amount from the funding account to the receiving account.

26. The system of claim 16, wherein the processor is further configured to transfer the savings amount from the first account at a specified time.

27. The system of claim 16, wherein the processor is further configured to validate the receiving account.

28. The system of claim 16, wherein the processor is further configured to send a notice to the customer if the receiving account is invalid.

29. The system of claim 16, wherein the processor is further configured to post a transaction that falls within the at least one type of transaction to the first account and the receiving account by displaying the transaction via the user interface.

30. The system of claim 16, wherein the processor is further configured to transfer a matching funds amount to the receiving account upon meeting a criterion of a matching savings plan, wherein the matching funds amount is calculated based on the savings amount.

31. An apparatus for an automatic savings plan, the apparatus comprising:
- a first means for enrolling a customer in the automatic savings plan, wherein the enrolling process involves:
  - a second means for accepting a designation of a first account as a funding account;
  - the second means being configured for accepting a designation of at least one second account as a receiving account;
  - the second means being configured for accepting a designation of at least one type of transaction to be included in the automatic savings plan; and
  - the second means being configured for accepting a designation of a specified time period to determine a savings amount;
- the first means being configured for receiving an account of a plurality of transactions that fall within the at least one type of transaction;
- the first means being configured for aggregating a cent amount of each of a plurality of transactions, the cent amount for each transaction being the decimal amount of a purchase price for the transaction, the aggregating occurring over the specified time period to determine the savings amount;
- a third means for transferring the savings amount from the funding account to the receiving account.

32. A computer readable medium having stored therein instructions which, when executed by an electronic computer processor of an online banking application server, cause the processor to:
- enroll a customer in an automatic savings plan, wherein enrolling the customer comprises: the customer designating, via a user interface of a client device, a first account as a funding account the customer designating, via the user interface, at least one second account as a receiving account the customer designating, via the user interface, at least one type of transaction to be included in the automatic savings plan; and the customer designating, via the user interface, a specified time period to determine a savings amount;
- receive, from an account information database, an account of a plurality of transactions that fall within the at least one type of transaction;
- aggregate a cent amount of each of the plurality of transactions, the cent amount for each transaction being the decimal amount of a purchase price for the transaction, the aggregating occurring over the specified time period to determine the savings amount;
- transfer the savings amount, by a funds transfer engine operatively associated with the online banking application server, from the funding account to the receiving account.

* * * * *